(12) United States Patent
Yoshino et al.

(10) Patent No.: US 6,625,525 B2
(45) Date of Patent: Sep. 23, 2003

(54) VEHICLE DRIVE SYSTEM AND CONTROLLING METHOD THEREOF

(75) Inventors: Takahiro Yoshino, Yokosuka (JP); Yuki Nakajima, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/985,797

(22) Filed: Nov. 6, 2001

(65) Prior Publication Data

US 2002/0062184 A1 May 23, 2002

(30) Foreign Application Priority Data

Nov. 22, 2000 (JP) .......................... 2000-355759

(51) Int. Cl.[7] .............................. B60L 11/04; B60K 1/00
(52) U.S. Cl. ........................................ 701/22; 180/65.2
(58) Field of Search ........................... 701/22, 101–105, 701/110–112; 290/7–11, 14–19, 21–25, 27–28, 31–35, 36 R, 40 R, 40 A–40 C, 47–48, 51–52; 180/54.1, 65.1–65.4; 477/3, 7; 310/102 R, 109, 113, 118, 121; 318/139–140, 146–147, 153, 157, 151, 778–779

(56) References Cited

U.S. PATENT DOCUMENTS

| 5,789,881 A | * | 8/1998 | Egami et al. ............... 180/65.4 |
| 6,065,565 A | * | 5/2000 | Puszkiewicz et al. ........ 182/148 |
| 6,131,680 A | * | 10/2000 | Nii et al. .................... 180/65.2 |
| 6,278,195 B1 | * | 8/2001 | Yamaguchi et al. ...... 290/40 A |

FOREIGN PATENT DOCUMENTS

| JP | 11-146503 | 5/1999 |
| JP | 2000-236602 | 8/2000 |

* cited by examiner

Primary Examiner—Thu Nguyen
(74) Attorney, Agent, or Firm—Foley & Lardner

(57) ABSTRACT

A controller (10, 11, 12) computes a virtual generated power, this being the power generated by a generator (2) when an engine (1) and the generator (2) are controlled so that the power generated by the generator (2) coincides with the power consumption of a motor (4) which is uniquely determined according to a vehicle running state, computes an output limiting value of the motor (4) based on the virtual generated power, and limits the power or torque of the motor (4) by the output limiting value.

5 Claims, 5 Drawing Sheets

VEHICLE DRIVE SYSTEM AND CONTROLLING METHOD THEREOF

FIELD OF THE INVENTION

This invention is related to a vehicle drive system and its controlling method.

BACKGROUND OF THE INVENTION

In recent years, due to demand for low pollution, energy saving and better infrastructure, attempts have been made to commercialize hybrid vehicles wherein an engine is combined with a generator and a motor.

Hybrid vehicle systems may be broadly classified as series or parallel types, and in both cases, all or part of the kinetic energy of the engine is converted to electrical energy by the generator. A part of the power produced by the generator is directly supplied to the motor, and the excess power is stored by a battery. Power is supplied to the motor from both the generator and the battery so as to drive the vehicle. Losses are not small when the energy produced by the engine passes through the generator, battery and motor, so the parallel type of hybrid vehicle, which comprises a means for directly driving the vehicle by engine power and has high efficiency, is now the most popular.

However, even in the series type, losses when the battery is charged or discharged can be largely reduced and an increase in efficiency can be expected if the power consigned by the motor is supplied from the generator without excess or insufficiency.

In this regard, JP-A-H11-146503 and JP-A-2000-236602 published by the Japanese Patent Office in 1999 propose a means of increasing efficiency of a series type hybrid vehicle by generating the required power based on the vehicle running state. The drive power (power consumption) of the motor varies according to the change of running state, but if power can be supplied from the generator in real-time without excess or insufficiency according to this variation, the power losses in the battery can be kept to the minimum, and the output of the engine can be transmitted to the motor with high efficiency.

However, when the power consumption of the motor varies sharply due to a sudden change of running state, a delay occurs in power generation due to the response delay of the engine and motor even if the engine and motor are controlled to make the generated power follow the change, so the generated power is then insufficient or excessive relative to the power consumption of the motor.

SUMMARY OF THE INVENTION

Regarding this point, one way of suppressing power losses in the battery might be to estimate the actual power generated based on the running state of the engine and motor, limit the power of the motor based on the estimated value and suppress the power difference between the power consumption of the motor and the power generated by the generator even in a transient state.

However, even under this control, when the battery temperature is correct and the battery is sufficiently charged, it may be advantageous not to supply all the power required by the motor from the generator in real-time, but to supply power to the motor from the battery. In other words, if fuel cost-performance can be improved regardless of the charge/discharge power losses of the battery, it is advantageous to run the vehicle steadily at an operating point where the engine is more efficient or restrict engine power, and make up the power deficiency from the battery.

In this case, however, it may occur that the power generated by the generator is less than the power consumption of the motor. Hence, if the power of the generator is limited according to the actual generated power as described above, the power of the motor is limited to low power when the power generated by the generator is low even in the same running state, and the output response of the motor decreases.

It is therefore an object of this invention to make the output response of the motor the same regardless of the power generated by the generator and power supplied by the battery in the same running state.

In order to achieve above object, this invention provides a drive system for a vehicle, comprising an engine, a generator connected to the engine, which regenerates the output of the engine, a motor for driving the vehicle which operates by power supplied from the generator, a battery which supplies power to the motor when the power supply to the motor is insufficient, and stores excess power when the supplied power is excessive, a sensor which detects a vehicle running state, and a controller which functions to compute a virtual generated power, which is the power generated by the generator when the engine and generator are controlled so that the power generated by the generator coincides with the power consumption of the motor which is uniquely determined according to the vehicle rung state, compute an output limiting value of the motor based on the virtual generated power, and limit the power or torque of the motor by the output limiting value.

The details as well as other features and advantages of this invention are set forth in the remainder of the specification and are shown in the accompanying drawings.

DESCRIPTION OF THE PREFERRED EMBODIMENTS

Figure 1:
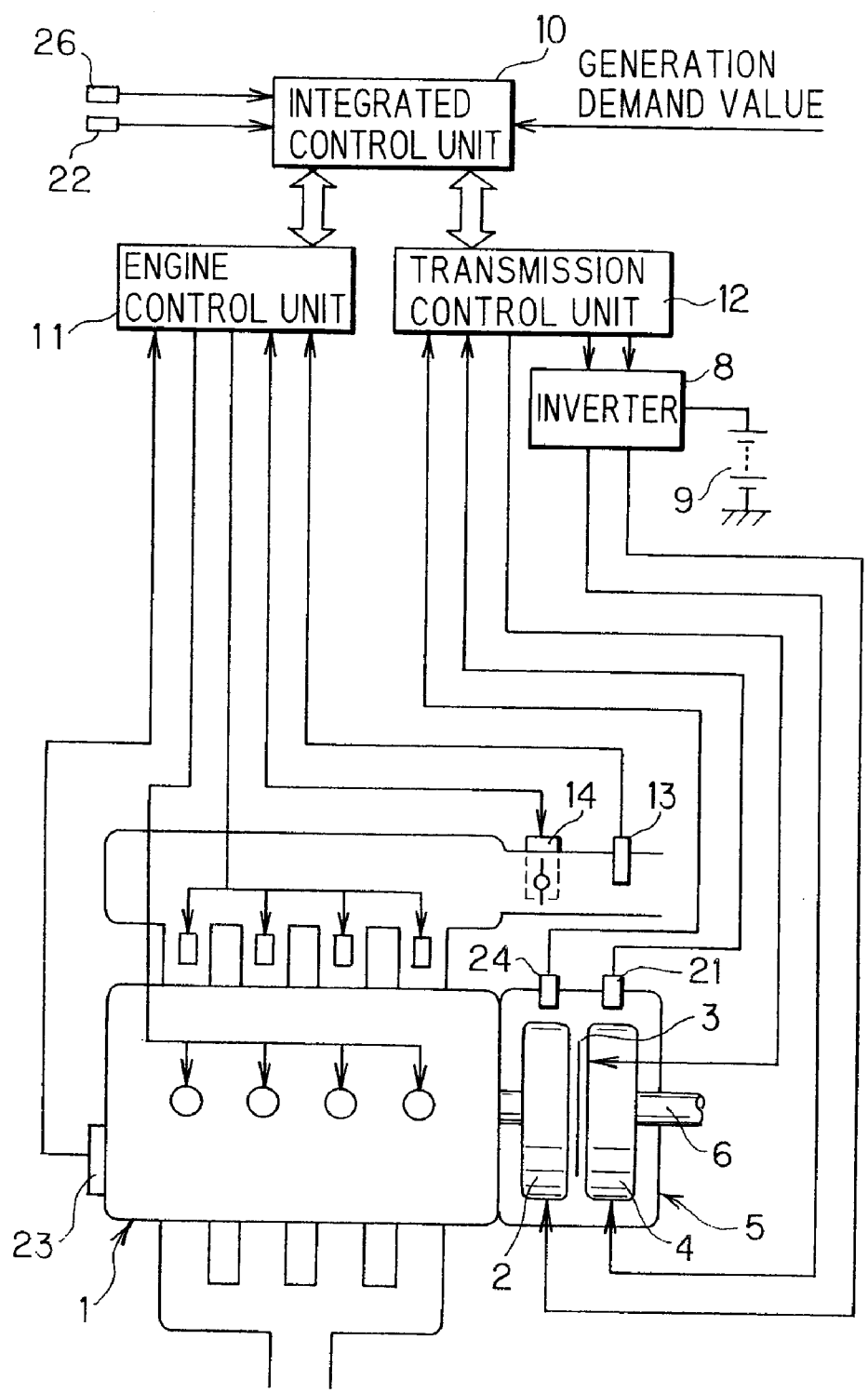
FIG. 1 is a schematic view of a vehicle drive system according to this invention.

Referring to FIG. 1 of the drawings, in a vehicle to which this invention is applied, an electrical power train 5 which functions as a continuously variable transmission is connected to an internal combustion engine 1 instead of a mechanical transmission. The electrical power train 5 comprises a first rotating machine (hereafter, generator) 2 used mainly as a generator, and a second rotating machine (hereafter, motor) 4 used mainly as a motor. A rotor shaft of the generator 2 is connected to a crankshaft of the engine 1, and a rotor shaft (hereafter, output shaft) of the motor 4 is connected to a drive shaft 6 via a reducing gear. The drive wheels are attached to the drive shaft 6.

The generator 2 and motor 4 are alternating current machines such as a permanent magnet alternating synchronous motor, and are respectively connected to an inverter 8. A battery 9 such as a lithium battery or a nickel hydrogen battery is connected to the inverter 8.

A clutch 3 is interposed between the generator 2 and motor 4. When the clutch 3 is engaged, the engine 1 and output shaft are directly connected, and the output shaft is directly driven by the engine 1. The clutch 3 may be engaged for example when the input shaft rotation speed and output shaft rotation speed of the power train 5 coincide, thereby suppressing losses in the generator 2 and motor 4 and improving the fuel cost-performance of the vehicle.

An input shaft rotation speed sensor 24 which detects a rotor rotation speed (input shaft rotation speed) Ni of the generator 2, and an output shaft rotation speed sensor 21 which detects a rotor rotation speed (output shaft rotation speed) No of the motor 4, are attached to the electrical power train 5.

An electronically controlled throttle 14 is provided in the intake passage of the engine 1, and the opening of the throttle 14 is controlled independently of the accelerator depression of the driver so that a target engine torque tTe set according to the required generated power is obtained. In addition, an air flow meter 13 which detects an intake air amount and a crank angle sensor 23 which detects a crank angle, are installed in the engine 1.

Basically, an integrated control unit 10 calculates a drive force required by the driver based on the detected accelerator depression amount, and controls the torque of the motor 4 via a transmission control unit 12 so that the required drive force is obtained. In addition, rotation speed control of the generator 2 via the transmission control unit 12 and torque control of the engine 1 via an engine control unit 11 are performed so that generated power matching the drive power (power consumption) of the generator 4 is realized.

Figure 2:
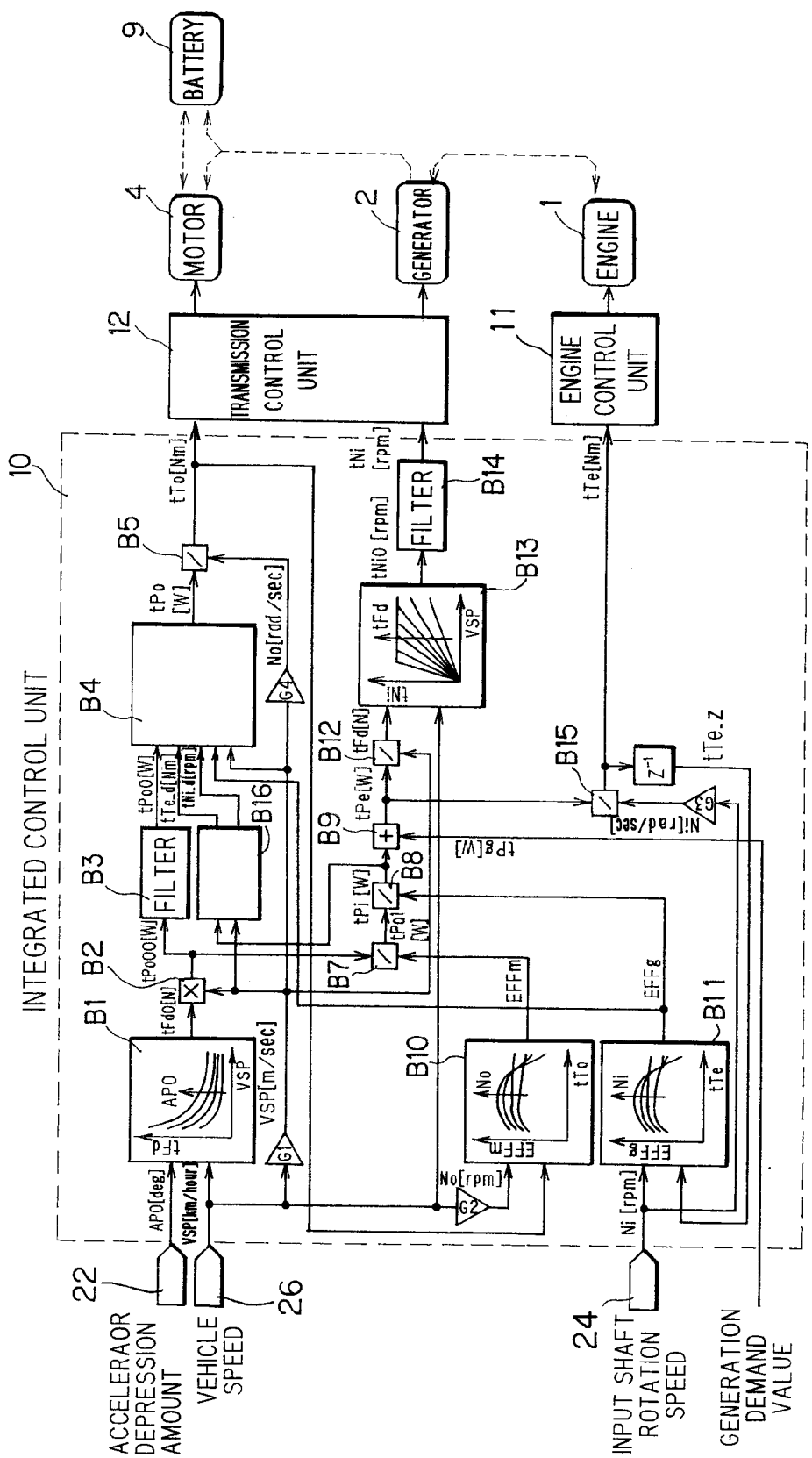
FIG. 2 is a block diagram of a drive control performed by an integrated control unit of the system.

FIG. 2 is a block diagram of the drive control performed by the integrated control unit 10, the part enclosed by the broken line in the figure corresponding to the integrated control unit 10.

An accelerator depression amount APO [deg] detected by an accelerator depression amount sensor 22, a vehicle speed VSP [km/hour] detected by a vehicle speed sensor 26 and a generation demand value tPg [W] are input to the integrated control unit 10. The input shaft rotation speed Ni [rpm] detected by the input shaft rotation speed sensor 24 is also input via the transmission control unit 12. The vehicle speed VSP may also be computed from the output shaft rotation speed No [rpm] detected by the output shaft rotation speed sensor 21, in which case the vehicle speed sensor 26 may be omitted.

A computing unit B1 computes a parameter tFd0 [N] by looking up a predetermined map based on the accelerator depression amount APO and vehicle speed VSP which show the vehicle running state. The parameter tFd0 is a target value of the force transmitted by the vehicle drive wheels to the road surface. A computing unit B2 computes a parameter tPo00 [W] by multiplying the vehicle speed VSP whereof the units have been converted from [km/hour] to [m/sec] by a constant G1 (=1000/3600), by the parameter tFd0.

A filter B3 calculates the parameter tPo0 [W] by filtering the parameter tPo00. This filtering is for example delay processing using a second order filter. This filtering is performed so that the response of the engine 1 which has a low response coincides with the response of the motor 4 by delaying the apparent response of the motor 4.

A limiting unit B4 applies limiting to the parameter tPo0, and calculates a target drive power tPo [W]. This limiting is performed to make the acceleration/deceleration response of the vehicle constant under the same running state regardless of the magnitude or sign of a generation demand value tPg. This processing will be described in detail later.

A computing unit B5 divides the target drive power tPo by the output shaft rotation speed No [rad/sec] to compute a target drive torque tTo [Nm]. Here, the output shaft rotation speed No calculated by multiplying the vehicle speed VSP [m/sec] by a constant G4 (=reduction ratio from motor output shaft to drive shaft 6/effective radius of drive wheels) is used, but the output shaft rotation speed No [rpm] detected by the output shaft rotation speed sensor 21 may be input to the integrated control unit 10 via the transmission control unit 12, and this value used after unit conversion.

The computed target drive torque tTo is transmitted to the transmission control unit 12. The transmission control unit 12 controls the inverter 8 according to the target drive power tTo to make the torque of the motor 4 coincide with the target drive torque tTo.

A computing unit B7 divides the parameter tPo00 by an efficiency EFFm of the motor 4 to compute a parameter tPo1 [W]. The motor efficiency EFFm is computed by a computing unit B10, by looking up a predetermined map based on the motor running state (target drive torque tTo and output shaft rotation speed No). The parameter tPo1 is the power which should be supplied to the motor 4 to make the power of the motor 4 equal to the parameter tPo00.

A computing unit B8 divides the parameter tPo1 by an efficiency EFFg of the generator 2 to compute a parameter tPi [W]. The generator efficiency EFFg is computed by a computing unit B11, by looking up a predetermined map based on the generator running state (target engine torque tTe and input shaft rotation speed Ni). The parameter tPi shows the power which should be supplied to the generator 2 to make the power of the generator 2 equal to the parameter tPo1.

A computing unit B9 computes a parameter tPe [W] by adding the generation demand value tPg from outside to the parameter tPi. The generation demand value tPg is the power required by electrical components mounted on the vehicle, and the engine 1 is run so as to obtain a power (parameter tPe) which is the power required to drive the vehicle (parameter tPi) plus the power required to generate the power required by electrical components (parameter tPg).

Depending on the state of charge (SOC) of the battery 9, some power may be supplied or discharged from the battery 9, and in such cases, the generation demand value tPg may be set to a negative value according to the permissible input/output power of the battery 9. If the generator required value tPg is set to a negative value, the power of the engine 1 is less than the power required to drive the vehicle (parameter tPi), and the insufficiency of power from the motor 4 is supplied from the battery 9. Due to this setting, the engine 1 may be stopped and the vehicle runs only by power from the battery 9 when it is running at low speed.

A computing unit B12 divides the parameter tPe by the vehicle speed VSP to compute a parameter tFd [N]. A computing unit B13 computes a parameter tNi0 [rpm] by looking up a predetermined map based on the parameter tFd and vehicle speed VSP. In the map used here, an input shaft rotation speed which realizes the target power of the engine 1 (parameter tPe) at an efficiency higher than a certain efficiency is set, and the input shaft rotation speed becomes lower, the lower the vehicle speed VSP becomes. If it is attempted to constantly maintain the efficiency of the engine 1 and generator 2 at an optimum level, the parameter tNi0 may be computed directly from the parameter tPe. However, in this case, the vehicle speed VSP and input shaft rotation speed (=engine rotation speed) are no longer related, and the driver of the vehicle may experience an uncomfortable feeling. To avoid this, the parameter tNi0 is computed by the above method. If the parameter tNi0 is computed directly from the parameter tPe, the computing unit B12 is unnecessary.

A filter B14 filters the parameter tNi0 to calculate the target rotation speed tNi [rpm]. This filtering is the same as the delay processing of the filter B3, and is performed so that the response of the engine 1 which has a low response coincides with the response of the generator 2 by delaying the apparent response of the generator 2.

The computed target rotation speed tNi is transmitted to the transmission control unit 12. The transmission control unit 12 controls the inverter 8 according to the target rotation speed tNi to make the rotation speed of the generator 2 coincide with the target rotation speed tNi.

A computing unit B15 divides the parameter tPe by the input shaft rotation speed Ni [rad/sec] to compute the target engine torque tTe [Nm]. Here, the input shaft rotation speed Ni is a value obtained after unit conversion by multiplying the input shaft rotation speed Ni [rpm] detected by the input shaft rotation speed sensor 24, by a constant G3 (=2×π/60). The computed target engine torque tTe is transmitted to the engine control unit 11. The engine control unit 11 controls the opening of the throttle 14 according to the target engine torque tTe to make the torque of the engine 1 coincide with the target engine torque tTe.

Figure 3:
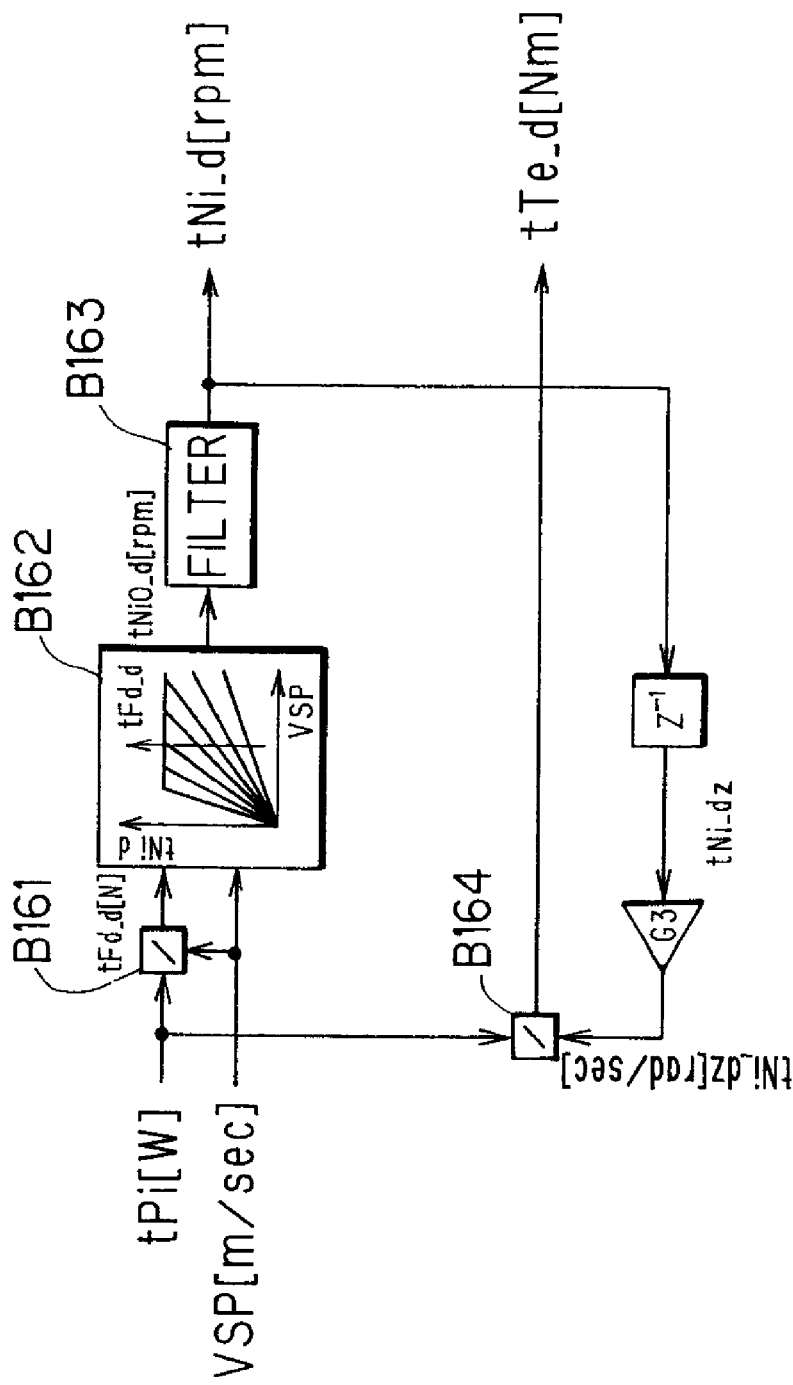
FIG. 3 is a block diagram of the processing in a computing unit B 16 in FIG. 2.

FIG. 3 is a block diagram showing the processing performed in a computing unit B16 in FIG. 2. Here, it is assumed that the output of the engine 1 always coincides with the parameter tPi, and virtual target values tTe_d, tNi_d of the engine 1 and generator 2 are computed. Specifically, the virtual target rotation speed tNi_d [rpm] of the generator 2 and virtual target engine torque tTe_d [Nm] of the engine 1 are computed assumed that all the power consumption of the motor 4 is covered by the power generated by the generator 2. The parameter tNi0 and parameter tPe take various values depending on the magnitude and sign of the generation demand value tPg even if the vehicle running state (accelerator depression amount APO and vehicle speed VSF) is identical, but if the vehicle running state is the same, the virtual target values tTe_d, tNi_d computed here are uniquely determined.

A computing unit B161 divides the parameter tPi by the vehicle speed VSP to compute a parameter tFd_d [N].

A computing unit B162 computes a parameter tNi0_d [rpm] by looking up the same map as the map looked up by the computing unit B13 based on the parameter tFd_d and vehicle speed VSP.

A computing unit B163 computes a virtual target rotation speed tNi_d by performing filtering on the parameter tNi0_d using the same filter as the filter B 14. A computing unit B164 divides the parameter tPi by the virtual target rotation speed tNi_d to compute a virtual target torque tTe_d. The virtual target rotation speed tNi_d used here is a value obtained after converting units to [rad/sec], by multiplying an immediately preceding value tNi_dz of the virtual target rotation speed tNi_d (value prior to a computation period TJOB), by the constant G3.

Next, the processing performed in the limiting unit B4 in FIG. 2 will be described.

In the limiting unit B4, the target drive power tPo0, which is used to compute the target drive torque tTo, is limited by a virtual generated power Pg_d [W] which the generator 2 would generate if the engine power were controlled to coincide with the parameter tPi.

Even if control is performed to make the power of the engine 1 always coincide with the parameter tPi, the virtual generated power Pg_d cannot always be made to coincide with the parameter tPo1. This is because during steady running when there is no acceleration or deceleration, the virtual generated power Pg_d coincides with the parameter tPo1, but if for example the rotation speed of the engine 1 rises, part of the engine power is used to increase the kinetic energy of the rotating components of the engine 1 and generator 2.

Here, if

Te=engine torque

Tg=generator torque

Ie=rotational inertia of engine rotating components

Ig=rotational inertia of generator rotating components

Pg=power generated by the generator

Po=drive power of the motor

Pb=battery power

η=generator efficiency, the equation of motion of the rotating components of the engine 1 and generator 2 may be expressed by the following equation (1):

$$Te+Tg=(Ie+Ig)\cdot\omega' \quad (1)$$

A parameter ω' is the differential of the angular velocity ω of the engine 1 and generator 2 (=angular acceleration).

The power Pg generated by the generator 2 may be expressed by the following equation (2):

$$Pg=Tg\cdot\omega\cdot\eta \quad (2)$$

Further, the relation between the power of the motor 4 and battery 9 may be expressed by the following equation (3):

$$Pg+Po=Pb \quad (3)$$

Here, if the permissible power range of the battery 9 is:

$$-Pb\text{max} \leq Pb \leq Pb\text{max} \quad (4)$$

from the above equations (1) to (4), the relation (5):

$$\{Te\cdot\omega-(Ie+Ig)\cdot\omega\cdot\omega'\}\cdot\eta-Pb\text{max} \leq tPo \leq \{Te\cdot\omega-(Ie+Ig)\cdot\omega\cdot\omega'\}\cdot\eta+Pb\text{max} \quad (5)$$

can be deduced. The drive power Po of the motor 4 must satisfy this relation (5).

Therefore, the target drive power tPo must be limited to satisfy the relation:

$$\{Te\cdot\omega-(Ie+Ig)\cdot\omega\cdot\omega'\}\cdot\eta-Pb\text{max} \leq tPo \leq \{Te\cdot\omega-(Ie+Ig)\cdot\omega\cdot\omega'\}\cdot\eta+Pb\text{max} \quad (6)$$

Figure 4:
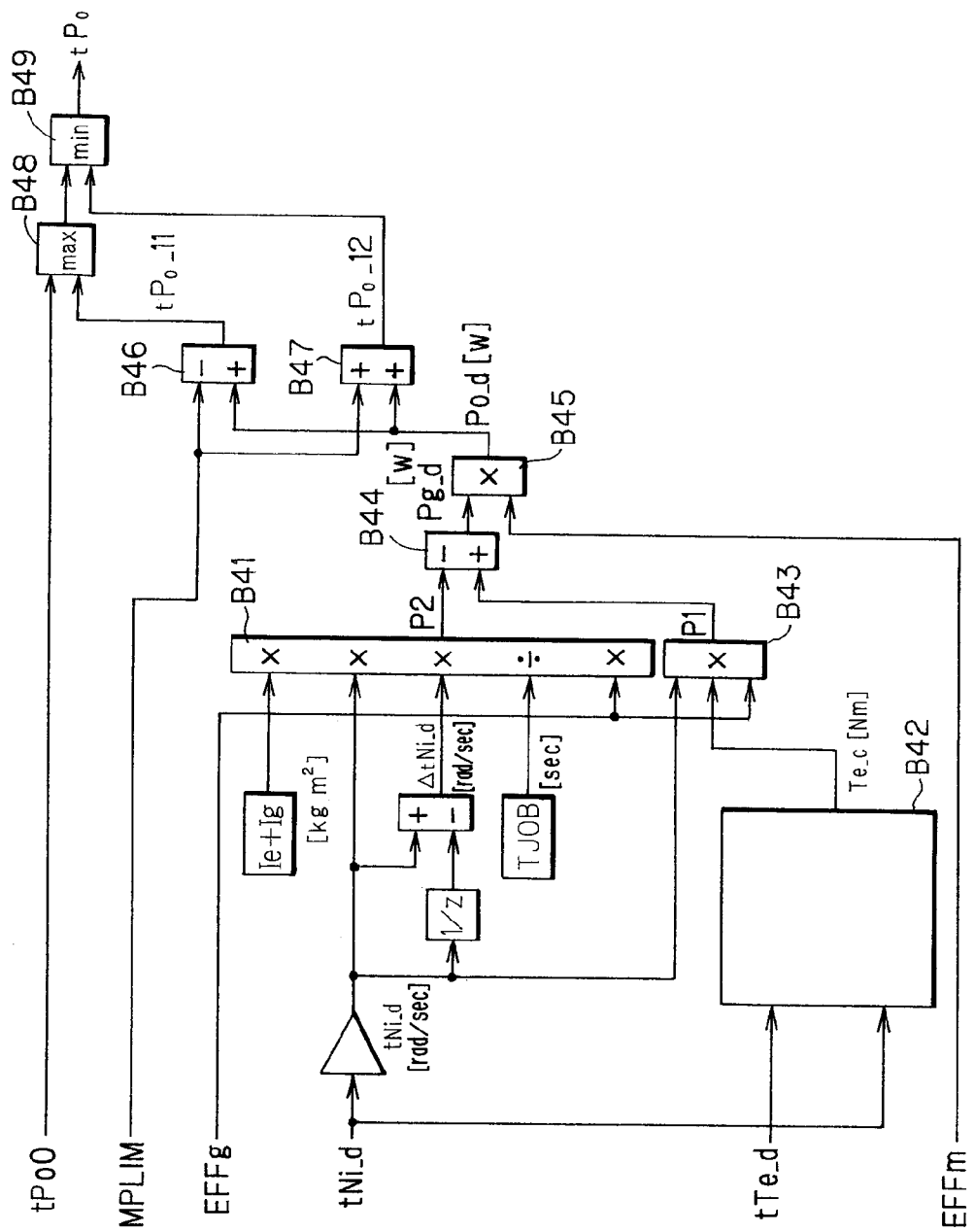
FIG. 4 is a block diagram in a limiting unit B4 in FIG. 2.

The specific processing of the limiting unit B4 will now be described referring to FIG. 4.

A computing unit B41 computes a parameter P2 [W] corresponding to the second term of equation (6) by the following equation (7), based on the sum of the rotational inertia Ie [kgm$^2$] of the engine 1 and the rotational inertia Ig [kgm$^2$] of the generator 2, the virtual target rotation speed tNi_d, a variation amount ΔtNi_d of the virtual target rotation speed tNi_d, the computation period TJOB [sec] and the generator efficiency EFFg.

$$P2 = (Ie + Ig) \times Ni\_d \times (\Delta tNi\_d / TJOB) \times EFFg \qquad (7)$$

The parameter P2 shows the work efficiency corresponding to the kinetic energy variation of the rotating components of the engine 1 and generator 2. The generator efficiency EFFg is computed by looking up the same map as the map used by the computing unit B 11 based on the virtual target rotation speed tNi_d and a parameter Te_c described hereafter.

A computing unit B42 computes the parameter Te_c [Nm] which is an estimated value of the engine torque at the current point assuming that control is performed to make the power of the engine 1 always coincide with the parameter tPi, based on the virtual target engine torque tTe_d and virtual target generator rotation speed tNi_d. The specific construction of the computing unit B42 will be described later.

A computing unit B43 computes a parameter P1 [W] corresponding to the first term of equation (6) by the following equation (8), based on the virtual target generator rotation speed tNi_d, the parameter Te_c and the generator efficiency EFFg.

$$P1 = Te\_c \times tNi\_d \times EFFg \qquad (8)$$

A computing unit B44 subtracts a parameter P2 from the parameter P1 to compute the virtual generated power Pg_d. As the virtual target generator rotation speed $tNi_{13}$ d and virtual target engine torque tTe_d are uniquely determined according to the running state, the virtual generator power Pg_d is also uniquely determined according to the running state.

A computing unit B45 multiplies the virtual generator power Pg_d by a motor efficiency EFFm to compute a parameter Po_d [W].

A computing unit B46 subtracts a permissible fluctuation width MPLIM of the power of the motor 4 from the parameter Po_d to compute a lower limiting value tPo_L1 of the target drive power tPo. Here, the permissible fluctuation width MPLIM corresponds to the lowest value of the permissible input/output power of the battery 9, and is a fixed value. A computing unit B47 adds the permissible fluctuation width MPLIM to the parameter Po_d to compute an upper limiting value tPo_L2 of the target drive power tPo. This upper limiting value tPo_L1 and lower limiting value tPo_L2 are output limiting values of the motor 4.

A comparator B48 outputs the larger value of the parameter tPo0 and the lower limiting value tPo_L1. A comparator B49 outputs the smaller of the output of the comparator B48 and the upper limiting value tPo_L2 as the target drive power tPo.

The permissible fluctuation width MPLIM used by the computing units B46, B47 are fixed values, but may for example be made variable according to the vehicle speed VSP. In this case, for example, the permissible fluctuation width MPLIM may be set to be large in a running region wherein it is desired to increase the acceleration/deceleration response of the vehicle (e.g., low vehicle speed region in which starting acceleration is performed).

Figure 5:
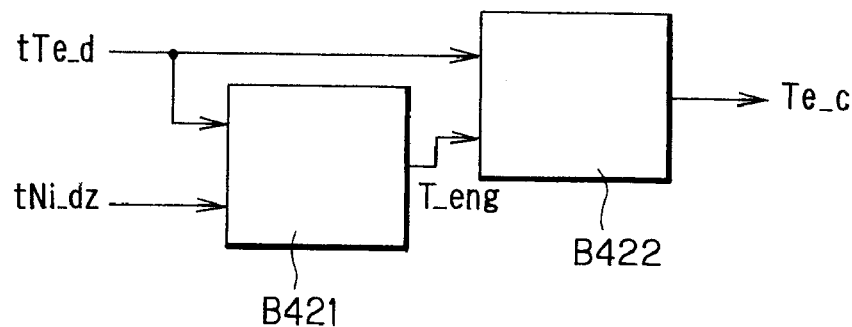
FIG. 5 is a block diagram of the processing in a computing unit B42 in FIG. 4.

FIG. 5 is a block diagram of the processing in the computing unit B42. The computing unit B42 comprises a computing unit B421 and a computing unit B422.

Figure 6:
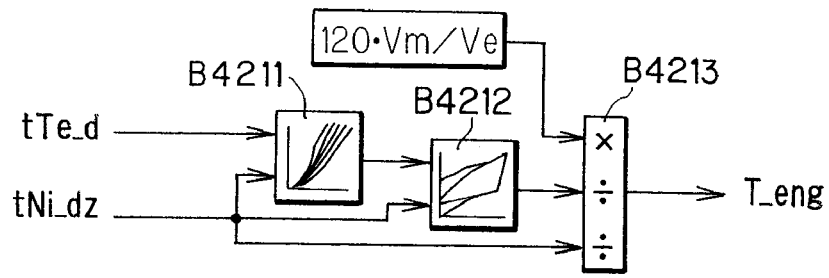
FIG. 6 is a block diagram of the processing in a computing unit B421 in FIG. 5.

As shown in FIG. 6, the computing unit B421 further comprises a computing unit B4211 which computes a volume efficiency of the engine 1 from the virtual target engine torque tTe_d and an immediately preceding value tNi_dz of the virtual target generator rotation speed tNi_d, a computing unit B4212 which computes a fresh air proportion in the cylinders of the engine 1 from the computed volume efficiency and the immediately preceding value tNi_dz of the virtual target generator rotation speed tNi_d, and a computing unit B4213 which computes a response time constant T_eng of the engine 1 from the fresh air proportion computed from the intake system volume and displacement of the engine 1, and the immediately preceding value tNi_dz of the virtual target generator rotation speed tNi_d. The computing unit B4213 computes the response time constant T_eng of the engine 1 by the following equation (9) based on an intake system model of the engine 1.

$$T_{13}\ eng = 2 \times Vm / (Ve \times \eta n \times Ni) \times 60 \qquad (9)$$

where,

Vm=intake system volume

Ve=engine displacement

ηn=fresh air proportion

Figure 7:
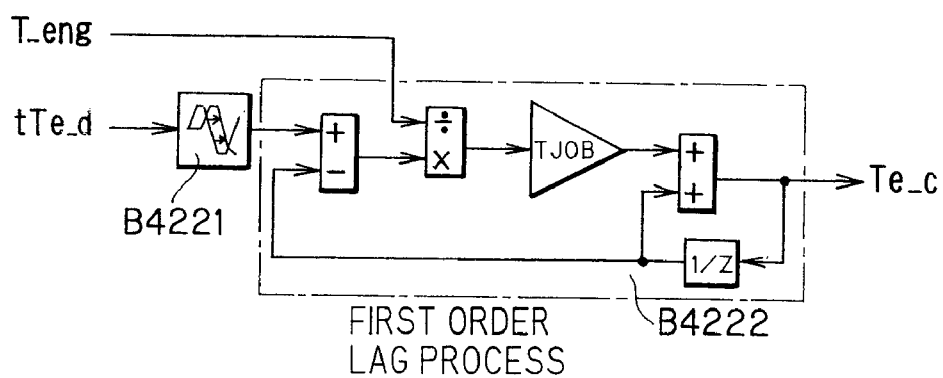
FIG. 7 is a block diagram of the processing in a computing unit B422 in FIG. 5.

As shown in FIG. 7, the computing unit B422 comprises a computing unit B4221 which performs a dead time processing on the virtual target engine torque tTe_d, and a computing unit B4222 which calculates the parameter Te_c by performing first-order lag processing using the response time constant T_eng on the virtual target engine torque tTe_d after dead time processing.

Next, the overall action will be described.

In the above drive system, the power generated by the generator 2 is supplied to the motor 4, and the drive wheels are thereby driven. The engine 1 and generator 2 are controlled to suppress charge/discharge losses by suppressing the input/output power of the battery 9, i.e., so that the generated power of the generator 2 coincides with the power consumption of the motor 4.

However, when the battery 9 is charged sufficiently (SOC is high) and it is advantageous from the viewpoint of improving fuel cost-performance to supply power from the battery 9 to the motor 4 rather than directly supplying power from the generator 2, even considering charge/discharge losses of the battery 9, the power is supplied from the battery 9. The engine 1 may also be operated steadily at a running point having high fuel cost-performance or its output may be reduced.

If the power generated by the generator 2 is decreased and an equivalent amount of power is supplied from the battery 9, the power consumption of the motor 4 and the power generated by the generator 2 no longer coincide. However, by applying this invention, the output limiting value of the motor 4 is computed based on the virtual generated power assuming that the engine 1 and generator 2 are controlled so that the power generated by the generator 2 coincides with the power consumption of the motor 4, and the drive power of the motor 4 is limited by this output limiting value. The virtual generated power is uniquely determined, so the output limiting value no longer varies even when the running state of the generator 2 varies, and variation in the response of the motor 4 is prevented.

Further, the output limiting value is set based on the virtual generated power and the permissible fluctuation width in the output of the motor 4, but as the permissible fluctuation width is a value set based on the lowest value of the permissible input/output power of the battery 9, i.e. it is a fixed value, the permissible fluctuation width in the output of the motor 4 does not fluctuate due to the fluctuation in the permissible input/output power of the battery 9, and fluctuation of the output limiting value leading to fluctuation in the response of the motor 4 is prevented. At this time, if the output limiting value is made to vary according to the running region, the response of the generator 2 can be increased in a running region where high acceleration/deceleration response is required, and drivability can be further enhanced.

Under running conditions where the operation of the engine 1 and generator 2 is controlled so that the power consumption of the motor 4 and the power generated by the generator 2 coincide, the above virtual generated power effectively coincides with the actual generated power, so the power consumption of the motor 4 and the power generated by the generator 2 effectively coincide, and the load on the battery 9 can be suppressed to the minimum.

This invention has been described in the case of a specific embodiment, but the above embodiment is only an example of the construction of a vehicle to which this invention may be applied, and the scope of the invention is not limited thereto. In the block diagram shown in FIG. 2 and subsequent figures, many modifications are possible. In the above embodiment, the drive power of the motor 4 was limited, but the drive torque of the motor 4 may also be limited in which case an identical effect is obtained.

Summarizing this invention, according to the invention, the drive power or drive torque of the motor 4 is limited by an output limiting value, and the output limiting value is computed based not on the actual power generated by the generator 2, but on a virtual generated power uniquely determined according to the vehicle running state (accelerator depression amount APO and vehicle speed VSP, or values equivalent thereto). The virtual generated power may for example be the power which would be generated by the generator 2 if all the power consumed by the motor 4 were covered by the power generated by the generator 2.

If the drive power or drive torque of the motor 4 is limited by the output limiting value based on the virtual generated power, the response of the motor 4 can be maintained constant under the same running condition and the vehicle can always be driven with good drivability, regardless of whether all the power consumed by the motor 4 is covered by the power generated by the generator 2, whether both the generated power and battery power are used to run the vehicle, or whether only battery power is used to run the vehicle.

If the power which would be generated by the generator 2 is a virtual generated power when the engine 1 and generator 2 are controlled so that the power generated by the generator 2 coincides with the power consumption of the motor 4, this virtual generated power can always be obtained by controlling the generator 2 and supplying power from the battery 9 or supplying power to the battery 9 (charging).

The virtual generated power is computed based on the estimated response of the engine 1 and generator 2, so it may be computed with higher precision than when it is calculated by a map of virtual generated power even in transient states.

The virtual generated power is calculated from the target generated power when the generator 2 is controlled so that the power generated by the generator 2 coincides with the power consumption of the motor 4, and the estimated response of the engine 1 and generator 2, so the output limiting value at which the input/output power of the battery 9 is a minimum and at which the decline in the response of the motor 4 is suppressed to a minimum, can be computed with high precision.

The output limiting value of the motor 4 is computed from the lowest value of the permissible input/output power of the battery 9 and the virtual generated power. This lowest value is the minimum value of the permissible input/output power when the battery 9 is used under ordinary operating conditions.

In general, the temperature range in which the battery is used is a fixed range (normally, the variation range of the outside atmospheric temperature which may normally be expected), and the charge state of the battery is also controlled to within a fixed range (e.g., 30%–80%). The response of the motor 4 can be maintained constant provided that the vehicle is always driven under ordinary conditions, even if the lowest value of the permissible input/output power under such ordinary conditions is added to or subtracted from the virtual generated power to set the output limiting value, and a higher response can be maintained than if the virtual generated power itself were set as the output limiting value. Moreover, even if the virtual generated power itself is set as the output limiting value and the vehicle is run under any conditions, the response of the motor 4 can still be maintained constant.

Further, if the output limiting value of the motor 4 is varied in a rung range where high acceleration/deceleration response is required, the acceleration/deceleration response in the running range where it is desired to increase the acceleration/deceleration response of the vehicle (e.g., the low vehicle speed region) can be improved, and drivability can be further enhanced.

The entire contents of Japanese Patent Application P2000-355759 (filed Nov. 22, 2000) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A drive system for a vehicle, comprising:
   an engine,
   a generator connected to the engine, which regenerates the output of the engine,
   a motor for driving the vehicle which operates by power supplied from the generator,
   a battery which supplies power to the motor when the power supply to the motor is insufficient, and stores excess power when the supplied power is excessive,
   a sensor which detects a vehicle running state, and
   a controller which functions to:
      when the engine and generator are controlled so that the power generated by the generator is different from the power consumption of the motor, compute a virtual generated power, which is the power generated by the generator when the engine and generator are controlled so that the power generated by the generator coincides with the power consumption of the motor which is uniquely determined according to the vehicle running state,
      compute an output limiting value of the motor based on the virtual generated power, and
      limit the power or torque of the motor by the output limiting value.

2. A drive system as defined in claim 1, wherein the controller further functions to:
   compute the output limiting value of the motor based on the lowest value of a permissible input/output power of the battery and the virtual generated power.

3. A drive system as defined in claim 2, wherein the controller further functions to:
   modify the output limiting value of the motor in a running range where high acceleration and deceleration response is required, in the direction in which the response of the motor is enhanced.

4. A drive system for a vehicle, comprising:

an engine, a generator connected to the engine, which regenerates the output of the engine, a motor for driving the vehicle which operates by power supplied from the generator, a battery which supplies power to the motor when the power supply to the motor is insufficient, and stores excess power when the supplied power is excessive, a sensor which detects a vehicle running state, and a controller which functions to:

compute a virtual generated power, which is the power generated by the generator when the engine and generator are controlled so that the power generated by the generator coincides with the power consumption of the motor which is uniquely determined according to the vehicle running state, compute an output limiting value of the motor based on the virtual generated power, limit the power or torque of the motor by the output limiting value, compute virtual target values of the engine and generator based on the vehicle running state, estimate the responses of the engine and generator relative to the virtual target values, and compute the virtual generated power based on the estimated responses.

5. A drive system as defined in claim 4, wherein the controller further functions to:

compute a target drive power of the motor based on the vehicle running state, and compute virtual target values of the engine and generator based on the target drive power of the motor.

* * * * *